(12) United States Patent
Johannsen

(10) Patent No.: US 7,849,641 B2
(45) Date of Patent: Dec. 14, 2010

(54) UNDERCARRIAGE FOR A TELESCOPIC FRAME

(75) Inventor: Thorkil J. Johannsen, Norval (CA)

(73) Assignee: Thor Global Enterprises Ltd., Mississauga, Ontario (CA)

( * ) Notice: Subject to any disclaimer, the term of this patent is extended or adjusted under 35 U.S.C. 154(b) by 679 days.

(21) Appl. No.: 11/776,714

(22) Filed: Jul. 12, 2007

(65) Prior Publication Data

US 2009/0013617 A1    Jan. 15, 2009

(51) Int. Cl.
*B65G 41/00* (2006.01)
*E04H 12/34* (2006.01)

(52) U.S. Cl. .................. 52/121; 414/505; 414/787; 414/574; 198/313; 52/118

(58) Field of Classification Search ........... 52/111–121, 52/67, 651.1, 651.05, 651.01, 651.07; 198/302, 198/313; 414/787, 574, 505
See application file for complete search history.

(56) References Cited

U.S. PATENT DOCUMENTS

| 3,291,258 | A | * | 12/1966 | Twilley ............... 182/211 |
| 3,297,148 | A | | 1/1967 | Andrews |
| 3,802,136 | A | * | 4/1974 | Eiler et al. .............. 52/115 |
| 3,836,014 | A | | 9/1974 | Johansson |
| 3,858,688 | A | * | 1/1975 | Galloway ............... 187/224 |
| 4,017,110 | A | * | 4/1977 | Pease et al. ............ 294/81.21 |
| 4,427,104 | A | | 1/1984 | Reid, Jr. |
| 4,483,448 | A | * | 11/1984 | Wittman et al. .......... 212/304 |
| 4,694,930 | A | * | 9/1987 | Kishi .................... 182/2.11 |
| 5,632,395 | A | | 5/1997 | Zimmermann |
| 6,056,252 | A | | 5/2000 | Johannsen |
| 6,360,876 | B1 | | 3/2002 | Nohl et al. |
| 6,527,131 | B1 | | 3/2003 | Brockelmann et al. |
| 6,729,464 | B2 | | 5/2004 | Thomas et al. |
| 6,929,113 | B1 | | 8/2005 | Hoover et al. |
| 7,284,947 | B1 | * | 10/2007 | Felton .................. 414/787 |
| 7,474,832 | B2 | * | 1/2009 | Boston et al. ............ 386/83 |

FOREIGN PATENT DOCUMENTS

CA    2223202    11/1997

* cited by examiner

*Primary Examiner*—Jeanette E. Chapman

(57) ABSTRACT

A telescopic undercarriage for raising and lowering a frame. The undercarriage includes a base section having a pair of parallel base legs extending from a first end to a second end of the base section, the base section including a first plurality of braces extending between respective upper surfaces of the base legs and a second plurality of braces extending between respective lower surfaces of the base legs, the base legs, first plurality of braces and second plurality of braces collectively providing an elongate central base section passage. The undercarriage also includes an extendable section slidably disposed within the base section passage and having opposed legs, a drive system for extending and retracting the extendable section relative to the base section.

16 Claims, 4 Drawing Sheets

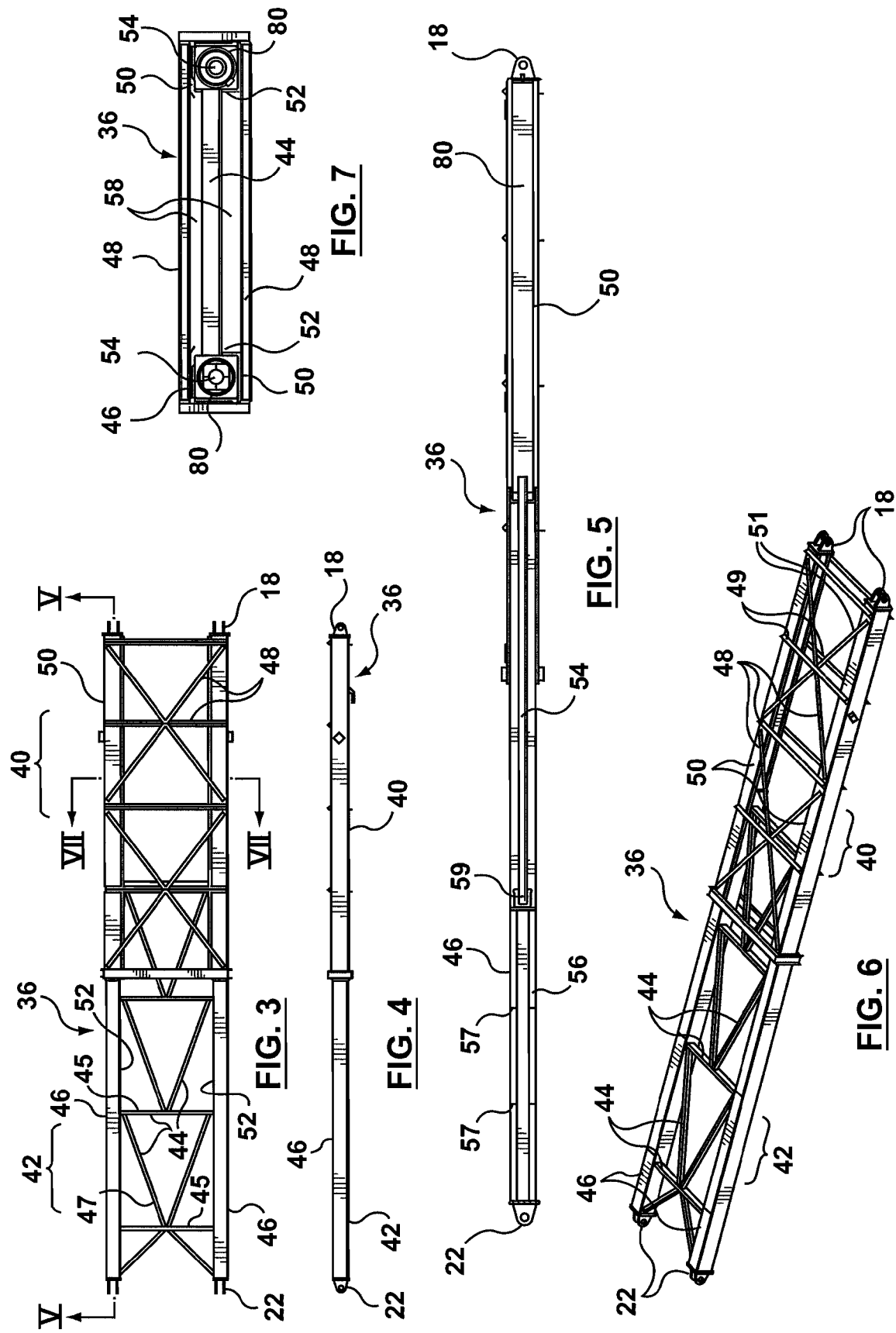

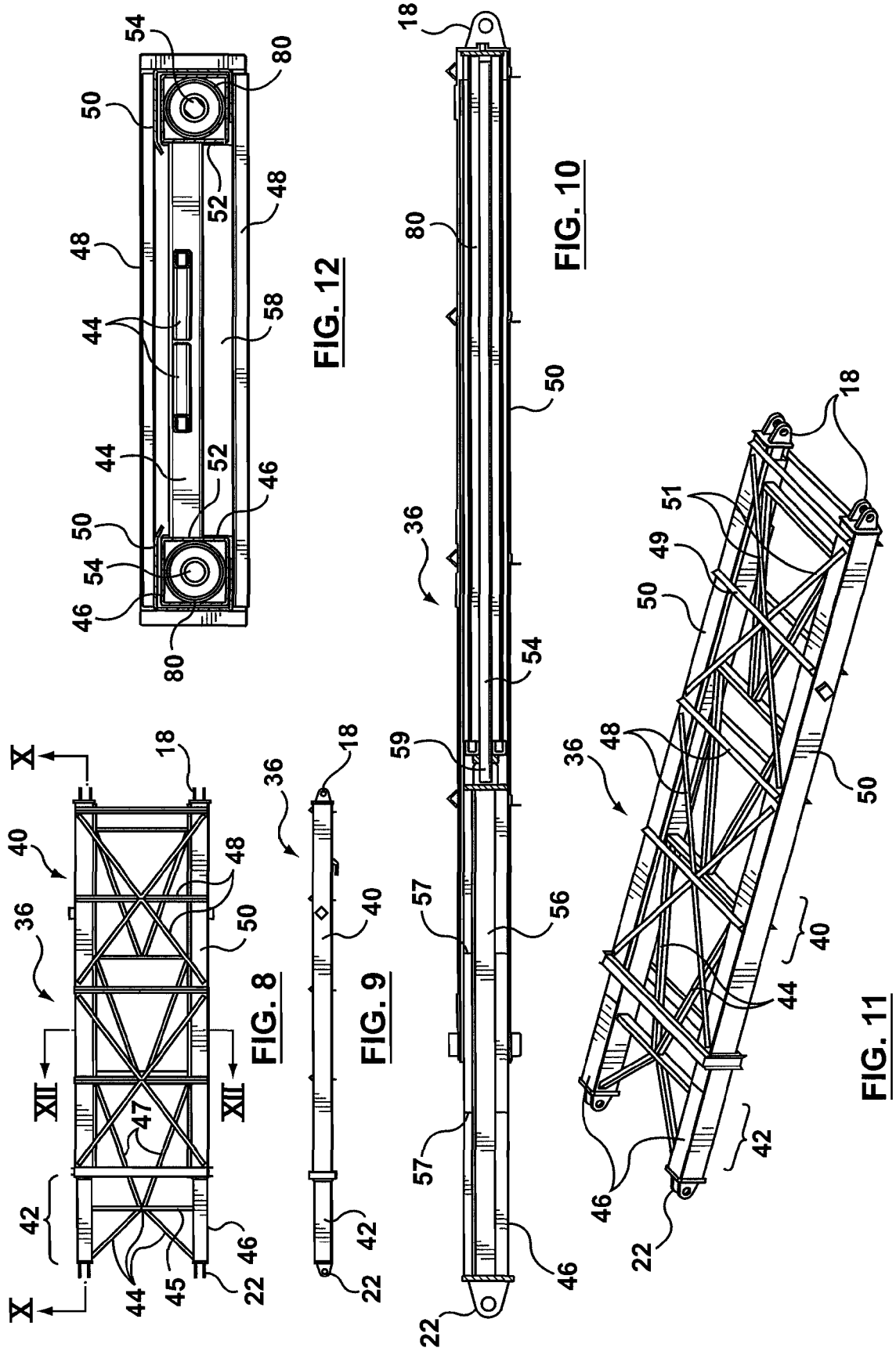

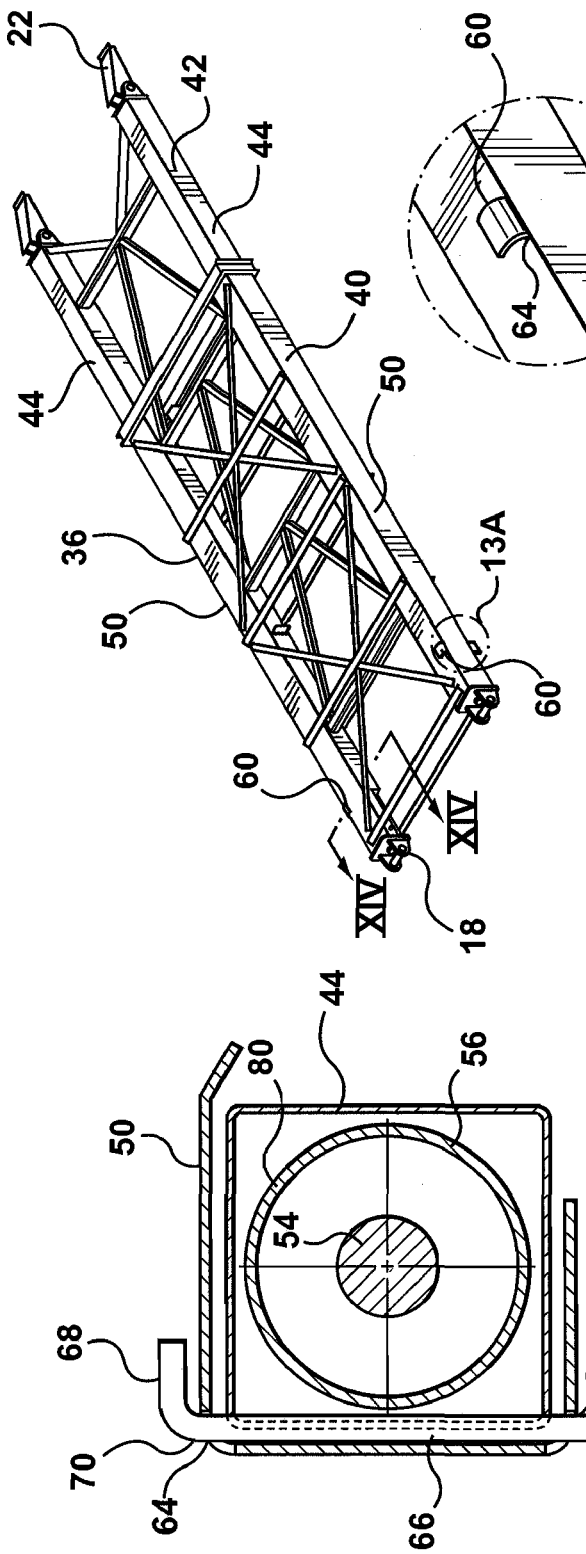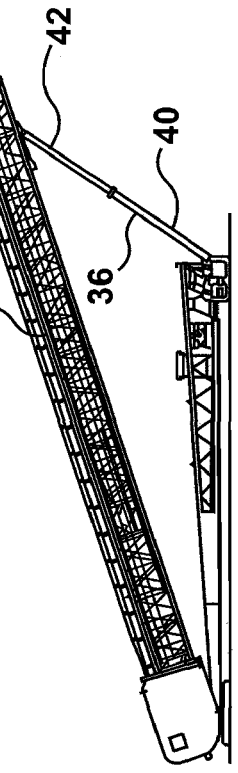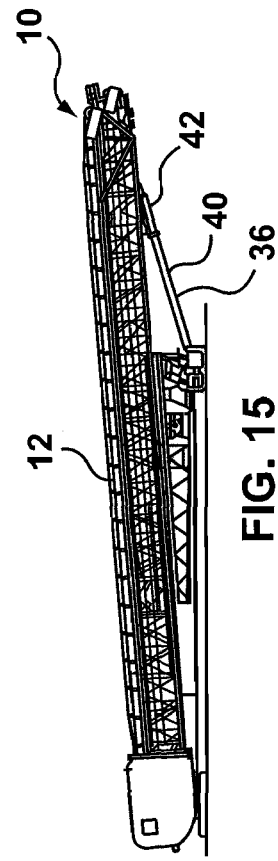

UNDERCARRIAGE FOR A TELESCOPIC FRAME

BACKGROUND

Embodiments of the present invention relate to a part for telescopic frames, namely an undercarriage for a telescopic frame.

Telescopic frames are often used in telescopic stackers that are used to move materials from one location to another.

Telescopic conveyor belts have seen use in heavy industries, such as the aggregate industry, where mobile conveyors are used to construct non-segregated stock piles of aggregate materials. Telescopic stackers or conveyor belts used in the aggregate industry are quite large, and in order to support telescopic conveyor systems of increasing size, an undercarriage must be made of ever stronger materials. An example of a telescopic stacker can be seen in U.S. Pat. No. 6,056,252.

SUMMARY OF THE INVENTION

According to one example embodiment is a telescopic undercarriage for raising and lowering a frame. The undercarriage includes a base section having a pair of parallel base legs extending from a first end to a second end of the base section, the base section including a first plurality of braces extending between respective upper surfaces of the base legs and a second plurality of braces extending between respective lower surfaces of the base legs, the base legs, first plurality of braces and second plurality of braces collectively providing an elongate central base section passage. The undercarriage also includes an extendable section slidably disposed within the base section passage and having opposed legs, a drive system for extending and retracting the extendable section relative to the base section.

According to one example embodiment is a telescopic undercarriage for raising and lowering a frame, comprising: a base section having a pair of parallel base legs extending from a first end to a second end of the base section, each base leg defining an elongate open-sided channel facing the other base leg, the base section including a first plurality of braces extending between respective upper surfaces of the base legs and a second plurality of braces extending between respective lower surfaces of the base legs, wherein the base legs, first plurality of braces and second plurality of braces collectively define an elongate base section passage; and an extendable section telescopically mounted within the base section passage for movement from the second end of the base section between retracted and extended positions and having opposed legs connected by a third plurality of braces extending therebetween, each of the opposed legs being slidably received within a corresponding one of the base leg channels.

According to another example embodiment is an undercarriage raising and lowering a telescopic frame that has a first end pivotally connected to a support frame, the undercarriage comprising: a base section having a pair of parallel base legs extending from a first end to a second end of the base section, each base leg defining an elongate open-sided channel facing the other base leg, the base section including a first plurality of braces extending between respective upper surfaces of the base legs and a second plurality of braces extending between respective lower surfaces of the base legs, wherein the base legs, first plurality of braces and second plurality of braces collectively define an elongate base section passage, the first end of the base section being pivotally mounted to the support frame at a location spaced apart from the first end of the telescopic frame; and an extendable section telescopically mounted within the base section passage for movement from the second end of the base section between retracted and extended positions and having opposed legs connected by a third plurality of braces extending therebetween, each of the opposed legs being slidably received within a corresponding one of the base leg channels, the exetendable section having an extending end connected to the telescopic frame.

According to another example embodiment is an undercarriage for a telescopic frame, the undercarriage being connected to the telescopic frame for arising and lowering an end thereof, the frame comprising: a base section having opposed inward-opening u-shaped legs having first ends pivotally connected to the horizontal frame, the u-shaped legs connected by a plurality of spaced apart braces extending from a top or bottom surface of a u-shaped leg to a corresponding top or bottom surface of the opposed u-shaped leg forming a passage; an extendable section disposed within the passage having opposed tubular legs with first ends pivotally connected to the telescopic frame and each tubular leg slidably received within a corresponding unshaped leg wherein the opposed tubular legs are connected by a plurality of spaced apart cross-braces; and a hydraulic drive system for extending and retracting the extendable section relative to the drive section.

BRIEF DESCRIPTION OF THE DRAWINGS

These and other advantages of the invention will become apparent upon reading the following detailed description and upon referring to the drawings in which:

FIG. 3 is a top view of an undercarriage for the telescopic conveyor system in an extended position;

FIG. 4 is a side view of the undercarriage of FIG. 3;

FIG. 5 is cross-sectional view of the undercarriage of FIG. 3 taken along line V-V of FIG. 3;

FIG. 6 is a perspective view of the undercarriage of FIG. 3;

FIG. 7 is a cross-sectional view of the undercarriage of FIG. 3 taken along line VII-VII of FIG. 3;

FIG. 8 is a top view of the undercarriage of FIG. 3 in a retracted position;

FIG. 9 is a side view of the undercarriage of FIG. 8;

FIG. 10 is cross-sectional view of the undercarriage of FIG. 9 taken along line X-X of FIG. 9;

FIG. 11 is a perspective view of the undercarriage of FIG. 9;

FIG. 12 is a cross-sectional view of the undercarriage of FIG. 9 taken along lines XII-XII of FIG. 9;

FIG. 13 is a perspective view of the undercarriage of FIG. 3 in partially extended position with a stopper inserted;

FIG. 13A is an expanded view of the portion of FIG. 13 indicated by circle 13A.

FIG. 14 is a cross-sectional view of the inserted stopper taken along line XIV-XIV in FIG. 13; and FIG. 15 is a side view of a radial stacker with the undercarriage of FIG. 3 in a completely retracted position for travel; and;

FIG. 16 is a side view of the radial stacker with the undercarriage in an extended use position.

Figure 1:
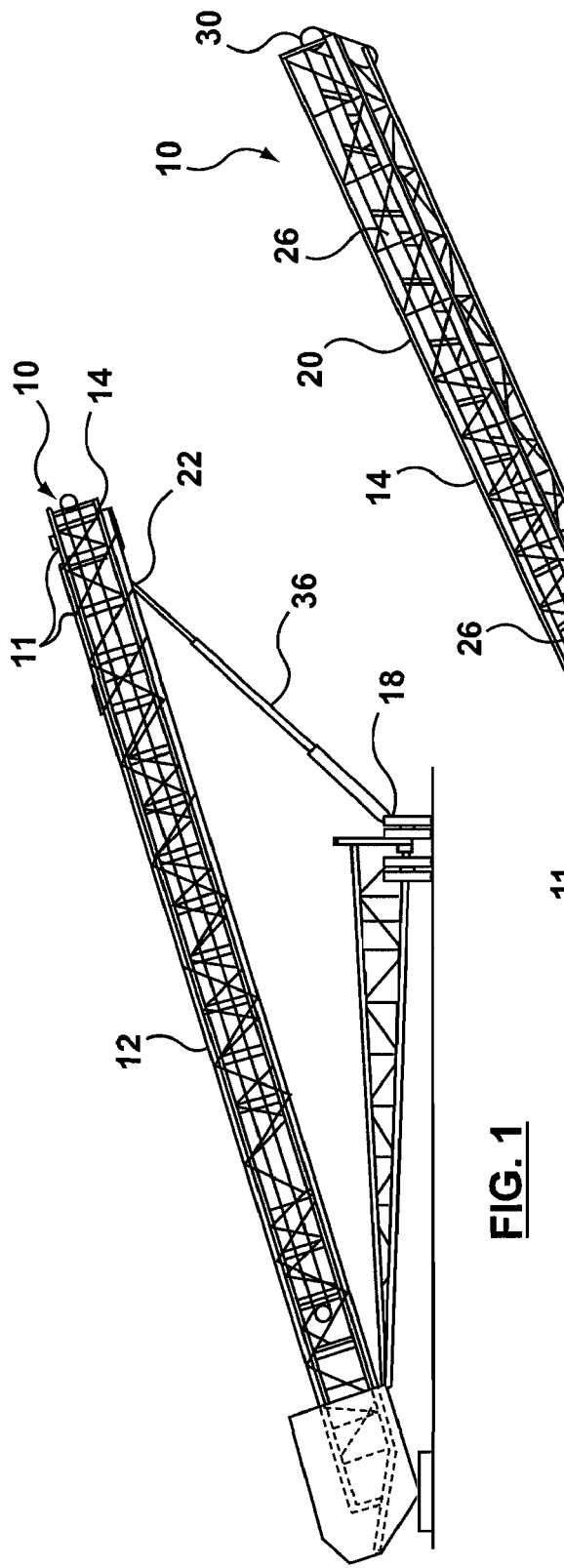
FIG. 1 is a side view of a telescopic conveyor system illustrating an environment in which the present invention may be used with an extendable frame in a retracted position.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DESCRIPTION OF EXAMPLE EMBODIMENTS

In the following description, similar features in the drawings have been given identical reference numerals where appropriate. All dimensions described herein are intended solely to illustrate an embodiment. These dimensions are not intended to limit the scope of the invention that may depart from these dimensions.

Undercarriages are often used to raise and lower movable structures such as extendable frames used for conveyor belts and radial stackers. Typical undercarriages include a base portion with a lower end fixed to a horizontal frame and an extendable portion with an upper end fixed to an upper end of a movable frame such as a conveyor belt frame. A hydraulic drive cylinder including a cylinder mounted to the base portion and a piston mounted to the extendable portion is used for extending and retracting the extendable portion. A debris guard may extend along an upper surface of the piston to deflect aggregate debris from the conveyor belt falling onto the piston. Angle iron cross braces are used to strengthen the undercarriage. However, the relative configuration of the pistons, base portions and extendable portions leave a large length of the extendible portion without cross braces. This places a structural limitation on the size of the undercarriage and consequently the size of the stacker (or other frame supported by the undercarriage). In at least some configurations, example embodiments of an undercarriage as described below are designed to support a telescopic stacker that can handle a higher capacity (tons per hour [TPH]) and which has a larger overall dimensions than typical stackers, resulting in a stacker that may create a larger stock pile and still be highway portable.

Figure 2:
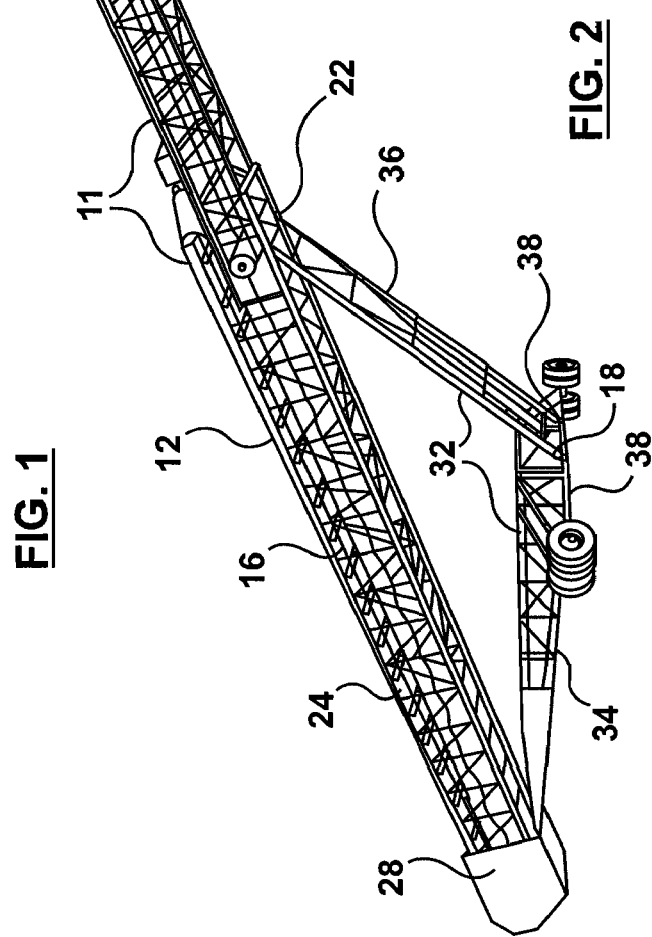
FIG. 2 is a perspective view illustrating the telescopic conveyor system of FIG. 1 with the extendable frame in an extended position.

Referring to FIGS. 1 and 2, there is shown an example of a telescopic conveyor belt system, which as shown is a radial stacker 10, demonstrating an environment in which example embodiments of an undercarriage 36 may operate. The stacker 10 includes a telescopic frame 11 which has an elongate base frame 12 and an elongate extendable frame 14. The extendable frame 14 is telescopically mounted for reciprocal movement in and out of the base frame 12. FIG. 1 illustrates the conveyor belt system 10 with the extendable frame 14 in a retracted position and FIG. 2 illustrates the conveyor belt system 10 with the extendable frame 14 in a fully extended position.

The conveyor belt system 10 includes a first conveyor belt 24, which is mounted on the base frame 12, and a second conveyor belt 26, which is mounted on the extendable frame 14. As best seen in FIG. 2, the first conveyor belt 24 is mounted such that its load carrying surface is located above upper support rails 16 of the base frame 12, and the second conveyor belt 26 is mounted such that its load carrying surface is located below the upper support rails 20 of the extendable frame 14. This configuration provides the necessary clearance for retracting the extendible frame 14 within the base frame 12. Conveyor belts 24 and 26 are mounted on their respective frames for movement in a conventional manner, and when in operation serve to move a load such as aggregate from a feed end 28 of the conveyor system, located at the lower end of the base frame 12, to a discharge end 30 of the conveyor system, located at an upper end of the extendable frame 14. The conveyor belt system 10 has an actuator system for extending and retracting the extendable section 14.

The telescopic frame 11 of the conveyor belt system 10 is mounted on a support frame 32, such that telescopic frame 11 can be raised and lowered and also transported from place to place. Support frame 32 includes a horizontal frame 34, to which the base frame 12 is pivotally mounted in the vicinity of its feed end 28. An undercarriage 36 is provided for elevating and lowering the telescopic frame 11. The undercarriage 36 is pivotally attached at its lower end 18 to the horizontal frame 34 and at its upper end 22 to base frame 12. Usually, undercarriage 36 is elevated and lowered by a hydraulic piston assembly. The maximum load bearing capability of undercarriage 36 constrains the height, and length that telescopic frame 11 may extend. The support frame 32 may include wheel assemblies 38 which can be rotated about the horizontal frame 34 between a use position as shown in FIGS. 1 and 2, and a transport position (FIG. 15). In the transport position, the wheel assemblies 38 extend parallel to the longitudinal axis of the telescopic frame 11, and permit the conveyor belt systems 10 to be towed from place to place (with the extendable frame 14 in a fully retracted position, and the telescopic frame 11 in a fully lowered position). Thus the conveyor belt system 10 may be a portable, telescopic, radial conveyor belt system which can be used for a number of applications, including forming non-segregated piles of aggregate.

The present disclosure is particularly concerned with the configuration of telescopic undercarriage 36, which is used to raise and lower the entire telescopic frame 11, which is shown in FIGS. 3 to 7 in an extended position and in FIGS. 8 to 12 in a retracted position. Although the telescopic undercarriage 36 is described in the context of a radial stacker, its application is not limited to a radial stacker and in other example embodiments can be used in combination with other frames or structures that need to be raised and lowered.

In undercarriage 36, as best indicated in FIGS. 3 and 6, the base section 40 has a lower end 18 that attaches to horizontal frame 34 and the extendible section 42 has an upper end 22 that attaches to the conveyer frame 12. Undercarriage 36 is configured so that cross-braces 44 extend between legs 46 of the extendable section 42 substantially the entire length of the extendable section 42. Cross-braces 48 extend between legs 50 of the base 40 substantially the entire length of the base section 40. Such a configuration provides improved strength and rigidity to the undercarriage 36, allowing for larger undercarriages and hence larger radial stackers to be manufactured. The cross-braces 44 and 48 may be, for example, elongate cylindrical members or elongate angle iron members.

In order to permit for bracing all the way along the lengths of the extendable section 42 and base section 40 the following configuration is provided. The extendable section 42 includes a pair of tubular, parallel legs 46. In the illustrated embodiment, tubular legs 46 each have square cross-sectional area, however the legs could alternatively have a circular or other type of multi-sided configuration. As shown in FIGS. 5 and 10, a respective drive piston 54 extends inside and is secured within each of the tubular legs 46. The tubular legs 46 (See FIGS. 3, 7 and 12 for example) have opposed inner facing surfaces 52 between which cross-braces 44 extend to interconnect the legs 46. As indicated in FIGS. 3 and 8, some braces 44 include braces 45 that extend at right angles between the legs 46 and angled braces 47 that each extend from a mid-point of a right angle brace 45 to a respective leg 46. Other cross-bracing configurations between legs 46 are possible. The tubular configuration of legs 46 allows for cross-bracing 44 between the inner surfaces of legs 46, and protects the internally located pistons 54 from debris. As shown in FIGS. 5 and 10, each piston 54 is anchored at one end 59 to an elongate piston anchor 56 that is located in each leg 46. In each leg 46, the piston anchor 56 is spaced from the interior walls of the leg 46 by mounting plates 57 to keep the piston 54 centered.

The base section 40 includes opposed legs 50 that are connected by cross braces 48. The opposed legs 50 each have a U-shaped cross-section, with the open-sides of the U facing each other and defining opposed channels so as to not interfere with the cross-bracing 44 of extendable section 42 as the legs 46 telescope in and out of legs 50 of base section 40. Furthermore, the cross braces 48 are located on top and bottom surfaces of the opposed base section legs 50, thereby providing a passage 58 between base section legs 50 and base section cross braces 48 for the extendable section 42 to telescope into and out of. As best seen in FIGS. 6 and 11, in one example embodiment, the base section cross-braces include braces 49 that extend at right angles between the upper and lower surfaces of the base legs 50, and angled braces 51 that are each connected at one end to a mid-point of right angle brace 49 and at an other end to one of the base section legs 50. Other cross-bracing configurations are possible. As best seen in FIGS. 5 and 10, a hydraulic drive cylinder 80 is secured in the U-shaped channel provided in each base leg 50 for driving the piston 54 that is secured to the extendable section leg 56 in order to extend and retract the extendable section 42 out of and into the passage 58. When the extendable section 42 is retracted, its tubular legs 46 each telescope partially over a respective one of the drive cylinders 80. Thus, when the undercarriage 36 is in a retracted position, a substantial portion of a piston 54 is received within a respective drive cylinder 80, which itself is substantially received within a respective extendable section tubular leg 46, which is substantially received within a respective one of the base legs 50.

It is contemplated that the cross braces 44 and 48 may be configured in any manner to provide structural support, provided that cross braces 48 connect respective top and bottom surfaces of the base section legs 50, and that cross braces 44 are configured to be disposed within the passage 58.

Turning now to FIGS. 13 to 16, in one example embodiment removable stoppers 60 can be placed in the lower ends of the base legs 50 to provide a mechanical barrier that prevents extendable legs 42 from being fully retracted into the base legs 50 during use of the undercarriage 36. More particularly, FIG. 15 shows the stacker 10 in a travel position in which the extendable section 42 of undercarriage 36 is fully retracted in the base section 36 to minimize the size of the stacker 10 for transport purposes, and FIG. 16 shows the stacker 10 with the undercarriage 36 in a fully extended use position. During use of the stacker 10, the extendable section 42 will typically never be in its fully retracted travel position, but rather will always be in at least a partially extended state. As will be appreciated from FIGS. 15 and 16, the forces applied to the hydraulic system that powers the undercarriage 36 will be greater when the extendable section is retracted. In one example embodiment, removable stoppers 60 are used to alleviate the stresses placed on hydraulic system used to extend and retract the undercarriage.

For example, as shown in FIGS. 13, 13A and 14, in one particular embodiment a rectangular slot 64 is provided near a lower end of each of the base legs 50 for receiving a respective removable stopper 60. The slots 64 are positioned so that when stoppers 60 are in place, they will engage the lower ends of the legs 44 of extendible section 42 as the extendable section is retracted into the base section 40 such that the extendable section 42 can only be partially retracted into the base section 40 and is prevented from sliding to a completely retracted position. In one example embodiment, the slots 64 are positioned so that when stoppers 60 are in place they engage the extendable section 42 when the extendable section 42 is in partially retracted position that corresponds to the minimum amount of extension of the undercarriage 36 required during use of the stacker 10. Thus, when the stoppers 60 are in place and engaging the lower ends of legs 44 of the extendable section 42, the stoppers will take at least some of the load off of the hydraulic system when the extendable section 42 is in its most retracted use position (shown in FIG. 13, which is not as retracted as the travel position shown on FIG. 15). In some applications, such a configuration can extend the life of the hydraulic system and/or allow a smaller hydraulic system to be employed and/or lighter undercarriage to be used than could otherwise be used in the absence of stoppers 60.

As best shown in FIG. 14, in at least one example embodiment, the slot 64 formed in a base leg 50 includes aligned upper opening 70 and lower opening 72. The stopper 60 in the illustrated embodiment takes the form of a removable pin having a first planer rectangular portion 66 for insertion through the upper and lower openings 70, 72, and portion 66 provides the mechanical barrier for engaging the extendable leg 44. An external stopper portion 68 extends substantially at a right angle from the insertable portion 66 for holding the stopper 60 in place and also providing a handle for removing the stopper 60. In other embodiments, other forms of mechanical barriers could be used to implement the functionality of stopper 60.

When being transported, it is desirable that extendible section 42 be fully inserted into base section 40 as shown on FIG. 15. Thus, stoppers 60 are removed from slots 64 during transportation and then, when the telescopic stacker 10 is to begin operation, extendable frame 14 is completely retracted, extendable section 42 is partially extended and stoppers 60 are placed in slots 64. In some example embodiments, the desired maximum retracted use position may vary depending on the application, and accordingly in some configurations multiple slots can be provided along base legs 50 to provide multiple positions for stoppers 60 so that the maximum retracted use position for undercarriage 36 can be easily adjusted.

Although the above description has focused on the use of the undercarriage in the context of a telescopic frame for a conveyor belt assembly, it will appreciated that the undercarriage could be used with frames used for other purposes.

Thus, it is apparent that there has been provided in accordance with the invention an undercarriage that fully satisfies the aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A telescopic undercarriage for raising and lowering a frame, comprising:
    a base section having a pair of parallel base legs extending from a first end to a second end of the base section, each base leg defining an elongate open-sided channel facing the other base leg, the base section including a first plurality of braces extending between respective upper surfaces of the base legs and a second plurality of braces extending between respective lower surfaces of the base legs, wherein the base legs, first plurality of braces and second plurality of braces collectively define an elongate base section passage;

an extendable section telescopically mounted within the base section passage for movement from the second end of the base section between retracted and extended positions and having opposed legs connected by a third plurality of braces extending therebetween, each of the opposed legs of the extendable section being slidably received within a corresponding one of the base leg channels; and a hydraulic drive system connected to the base section and extendable section for extending the extendable section from the second end of the base section and retracting the extendable section into the base section, the hydraulic drive system including a first hydraulic drive cylinder driving a first piston and a second hydraulic drive cylinder driving a second piston, the first hydraulic drive cylinder being mounted within one of the base leg channels and the first piston being mounted within one of the extendable section legs, the second hydraulic drive cylinder being mounted within the other of the base leg channels and the second piston being mounted within the other of the extendable section legs such that when the extendable section is extended, the pistons therein and their mountings serve as reinforcement.

2. The undercarriage according to claim 1 wherein the third plurality of braces includes cross-bracing that extends substantially along an entire length of the extendable section.

3. The undercarriage according to claim 1 wherein the extendable section can be retracted within the base section passage to a transport position and extended to a plurality of use positions, the undercarriage including a releasable mechanical stopper mounted to the base section and having a contact portion for engaging the extendable section to prevent retraction of the extendable section fully to the transport position.

4. The undercarriage according to claim 3 wherein the stopper includes a removable pin having the contact portion for insertion through a corresponding slot provided through one of the base legs near the first end.

5. The undercarriage according to claim 4 wherein the pin includes an external stopper portion extending substantially at a right angle from an upper end of the contact portion for engaging an upper surface of the base leg into which the pin is inserted.

6. The undercarriage according to claim 1 in combination with a radial stacker wherein the first end of the base section is connected to a base support frame of the radial stacker and an extendable end of the extendable section is connected to a telescopic conveyor belt for raising and lowering the telescopic conveyor belt.

7. The undercarriage according to claim 1 wherein the base legs each have a U-shaped cross-section.

8. An undercarriage raising and lowering a telescopic frame that has a first end pivotally connected to a support frame, the undercarriage comprising:

a base section having a pair of parallel base legs extending from a first end to a second end of the base section, each base leg defining an elongate open-sided channel facing the other base leg, the base section, including a first plurality of braces extending between respective upper surfaces of the base legs and a second plurality of braces extending between respective lower surfaces of the base legs, wherein the base legs, first plurality of braces and second plurality of braces collectively define an elongate base section passage, the first end of the base section being pivotally mounted to the support frame at a location spaced apart from the first end of the telescopic frame;

an extendable section telescopically mounted within the base section passage for movement from the second end of the base section between retracted and extended positions and having spaced apart opposed legs having facing surfaces connected by a third plurality of braces extending therebetween, each of the opposed legs being slidably received within a corresponding one of the base leg channels, the extendable section having an extending end connected to the telescopic frame; and a hydraulic drive system connected to the base section and extendable section for extending the extendable section from the second end of the base section and retracting the extendable section into the base section, wherein the third plurality of braces includes cross-bracing that extends substantially along an entire length of the extendable section, and the hydraulic drive system is located outside of the region between the facing surfaces of the opposed legs of the extendable section and within each said legs so as to not interfere with the cross-bracing and serve as reinforcement.

9. The undercarriage according to claim 8 wherein the hydraulic drive system includes a first hydraulic cylinder driving a first piston and a second hydraulic cylinder driving a second piston, the first hydraulic drive cylinder being mounted within one of the base leg channels and the first piston being mounted within one of the extendable section legs, the second hydraulic cylinder being mounted within the other of the base leg channels and the second piston being mounted within the other of the extendable section legs, the pistons and their mountings serving to reinforce the extendable legs.

10. The undercarriage according to claim 8 wherein the extendable section can be retracted within the base section passage to a transport position and extended to a plurality of use positions, the undercarriage including a releasable mechanical stopper mounted to the base section and having a contact portion for engaging the extendable section to prevent retraction of the extendable section fully to the transport position.

11. The undercarriage according to claim 10 wherein the stopper includes a removable pin having the contact portion for insertion through a corresponding slot provided through one of the base legs near the base section first end.

12. The undercarriage according to claim 11 wherein the pin includes an external stopper portion extending substantially at a right angle from an upper end of the contact portion for engaging an upper surface of the base leg into which the pin is inserted.

13. The undercarriage of claim 8 wherein the telescopic frame supports a conveyor belt system for moving aggregate.

14. An undercarriage for a telescopic frame, the undercarriage being connected to the telescopic frame for raising and lowering an end thereof, the frame comprising:

a. a base section having opposed inward-opening u-shaped legs having first ends pivotally connected to a horizontal under-frame, the u-shaped legs connected to each other by a plurality of spaced apart braces extending from a top or bottom surface of a u-shaped leg to a corresponding top or bottom surface of the opposed u-shaped leg and a passage defined between said base legs and said plurality of braces;

b. an extendable section disposed within the passage having opposed tubular legs with first ends pivotally connected to the telescopic frame and each tubular leg slidably received within a corresponding u-shaped leg wherein the opposed tubular legs are connected by a plurality of spaced apart cross-braces that provide cross-bracing along substantially an entire length of the extendable section; and c. a hydraulic drive system for extending and retracting the extendable section relative to the base section, the hydraulic drive system being positioned within each said legs in both sections for reinforcement.

15. The undercarriage of claim 14 further comprising: a stopper insertible into a corresponding slot in a leg of the base section to prevent retraction of the extendable section beyond a predetermined amount.

16. A telescopic undercarriage configured to support a telescopic conveyor belt, the undercarriage comprising:

a base section having a pair of parallel base legs extending from a first end to a second end of the base section, each base leg defining an elongate open-sided channel facing the other base leg, the base section including a first plurality of braces extending between respective upper surfaces of the base legs and a second plurality of braces extending between respective lower surfaces of the base legs, wherein the base legs, first plurality of braces and second plurality of braces collectively define an elongate base section passage;

an extendable section telescopically mounted within the base section passage for movement from the second end of the base section between retracted and extended positions and having opposed legs connected by a third plurality of braces extending therebetween, each of the opposed legs being slidably received within a corresponding one of the base leg channels; and a pair of extendible hydraulic drives for telescopically extending the extendable section relative to the base section, each hydraulic drive being positioned within a respective one of the base leg channels and extending into a corresponding leg of the extendable section as reinforcement.

* * * * *